United States Patent
Leppich et al.

(10) Patent No.: US 7,285,756 B2
(45) Date of Patent: Oct. 23, 2007

(54) BAKING OVEN AND METHOD OF OPERATING A BAKING OVEN

(75) Inventors: Peter Leppich, Arnstein (DE); Martin Pittroff, Arnstein (DE); Mathias Schmitt, Arnstein (DE)

(73) Assignee: MIWE Michael Wenz GmbH (DE)

( * ) Notice: Subject to any disclaimer, the term of this patent is extended or adjusted under 35 U.S.C. 154(b) by 653 days.

(21) Appl. No.: 10/808,025

(22) Filed: Mar. 24, 2004

(65) Prior Publication Data

US 2004/0200362 A1    Oct. 14, 2004

(30) Foreign Application Priority Data

Apr. 9, 2003    (DE) ................................ 103 16 503

(51) Int. Cl.
*A21B 1/26*    (2006.01)
(52) U.S. Cl. .................. 219/400; 99/475; 126/21 A
(58) Field of Classification Search ...................... None See application file for complete search history.

(56) References Cited

U.S. PATENT DOCUMENTS

| 6,545,251 B2 * | 4/2003 | Allera et al. ................. 219/400 |
| 6,943,321 B2 * | 9/2005 | Carbone et al. ............ 219/400 |
| 2006/0006163 A1 * | 1/2006 | Carbone et al. ............ 219/400 |

FOREIGN PATENT DOCUMENTS

| DE | 87 03 666 | 6/1987 |
| DE | 291 686 | 7/1991 |

* cited by examiner

*Primary Examiner*—Joseph Pelham
(74) *Attorney, Agent, or Firm*—McGlew & Tuttle, P.C.

(57) ABSTRACT

A baking oven and a method of operating a baking oven, in particular a shop baking oven, having a baking chamber, in which the goods to be baked can be accommodated has at least one heating system (09) for heating air circulating in the baking chamber (03) and has at least two fans (10, 11) for circulating the air in the baling chamber (03). During a baking operation, at least one co-rotating phase (P1, P3) is provided during which the fans (10, 11) are driven to rotate in the same direction. In addition, at least one contra-rotating phase (P2, P4) during which the fans (10, 11) are driven to operate in the opposite direction is also provided during the baking operation.

6 Claims, 4 Drawing Sheets

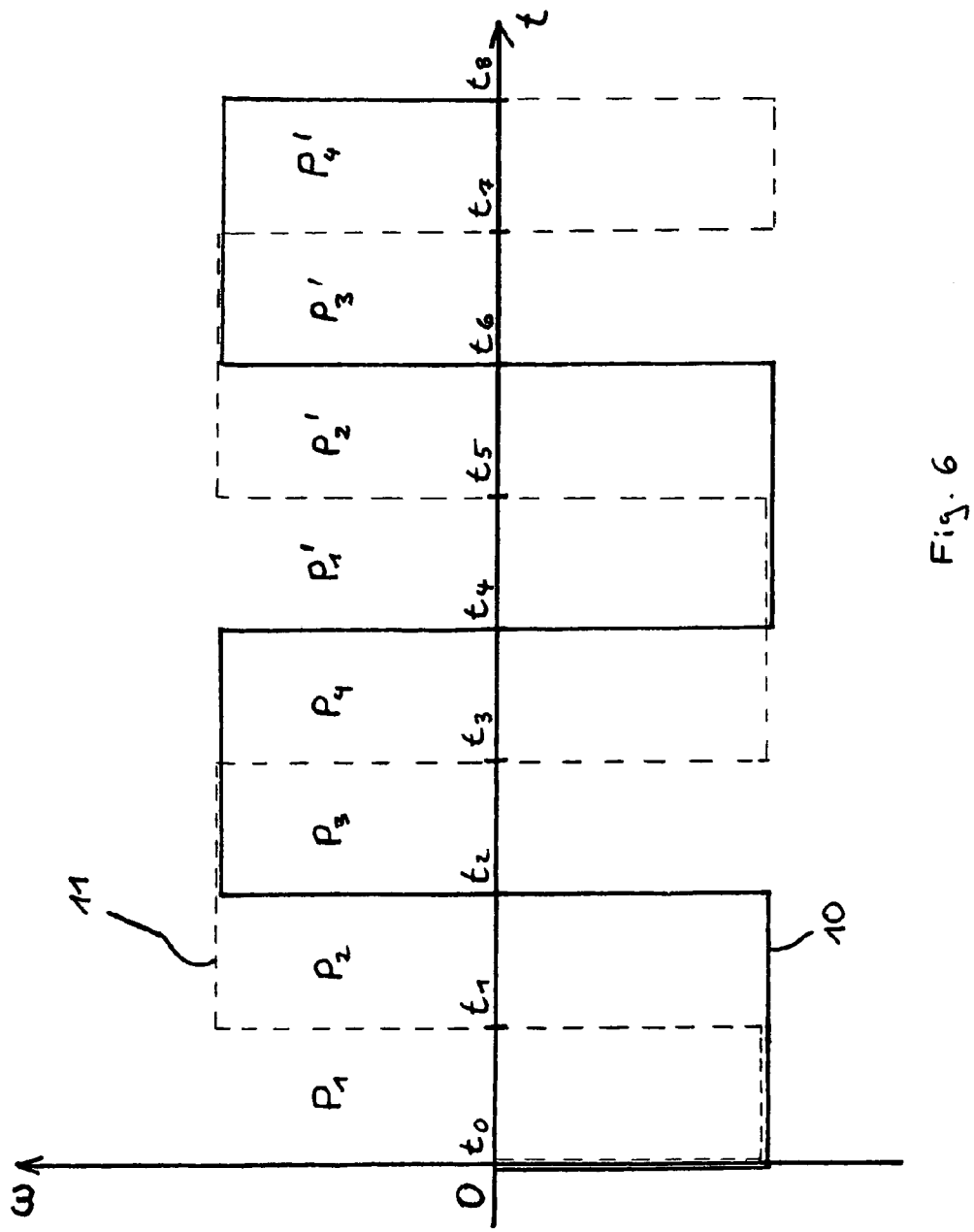

BAKING OVEN AND METHOD OF OPERATING A BAKING OVEN

CROSS REFERENCE TO RELATED APPLICATIONS

This application claims the benefit of priority under 35 U.S.C. § 119 of German patent application DE 103 16 503 filed Apr. 9, 2003 the entire contents of which are incorporated herein by reference.

FIELD OF THE INVENTION

This invention relates to a baking oven and/or a method of operating a baking oven in particular a shop baking oven, having a baking chamber in which the goods to be baked can be accommodated, having at least one heating system for heating air circulating in the baking chamber and having fans for circulating the air in the baking chamber.

BACKGROUND OF THE INVENTION

Generic baking ovens are frequently used as shop baking ovens, so that precooked bakery products can be finished in the shop. To supply the required heat to the bakery goods, heating systems such as electric heating rods are provided in the generic baking ovens, so that the air circulating in the baking chamber can be heated. To maintain adequate circulation of the air in the baking chamber, fans are used to circulate the air in the baking chamber.

In Patent DD 291 686 A5 a shop baking oven is operated with just one fan for circulating the air in the baking chamber. One disadvantage of this baking oven is that since only one fan is being used, the available air circulation capacity is often inadequate.

Patent DE 87 03 666 discloses a hot air baking oven having two fans for circulating the air in the baking chamber. The one fan draws air out of the baking chamber into a heating chamber where the air is heated as it passes over electric heating rods. After heating the air in the heating chamber, it is conveyed by a second fan back into the baking chamber where the bakery goods arranged therein are heated.

One disadvantage of this baking oven known from the state of the art is that because of the given air flow conditions prevailing in the baking chamber, the uniformity of the baked products is often inadequate. Thus in generic baking ovens, there are often areas in which bakery goods are heated to a greater extent than those in other areas. Because of this nonuniform heating of the bakery goods, depending on their arrangement in the baking chamber, the average quality of the baked products suffers.

SUMMARY OF THE INVENTION

Therefore, the object of the present invention is to provide a baking oven and a method of operating a baking oven with which a more uniform baking result can be achieved.

According to the invention, a baking oven, in particular a shop baking oven, is provided having a baking chamber in which the goods to be baked can be accommodated, having at least one heating system for heating air circulating in the baking chamber and having at least two fans for circulating the air in the baking chamber. The fans can be driven to rotate in the same direction or in opposite directions.

This invention is based on the fundamental idea of not driving the fans in the same direction or in opposite directions during the entire baking operation, as has been customary in the past, but instead there is at least one co-rotating phase during which the fans are driven to rotate in the same direction; and there is at least one contra-rotating phase during which the fans are driven to run in opposite directions. By switching between driving the fans in the same direction and in opposite directions, completely different circulating airflows are achieved in the baking oven in the corresponding co-rotating phases and/or contra-rotating phases, which consequently leads to equalization of flow differences and thus to equalization of differences in heat distribution. On the whole, by switching between co-rotating phases and contra-rotating phases, it is possible to achieve a more uniform baking result.

The uniformity of the baked products can be further increased if the switching is performed not only between co-rotating and contra-rotating phases but if there is also a switch in the direction of rotation of the individual fans during the different co-rotating phases and/or contra-rotating phases. In the case of co-rotating phases, this may take place in such a manner that during a baking operation, two different co-rotating phases are run through in succession in which case the fans are driven to rotate clockwise during the first co-rotating phase and are driven to rotate counterclockwise in the second co-rotating phase. In the normal case it does not matter here whether the fans are first driven to rotate clockwise or first counterclockwise.

In the case of the contra-rotating phases, it is also conceivable for the fans to run through two different contra-rotating phases during a baking operation in which case the fans are driven to rotate in the opposite direction of rotation during the different contra-rotating phases.

As a result, the baking operation may thus run through any desired number of different types of operating phases which are characterized in that the fans are driven in co-rotating or contra-rotating operation and in addition the direction of rotation of the fans can also be varied in the individual operating phases.

According to a preferred embodiment, it is provided here that the fans will each go through a co-rotating phase between two contra-rotating phases. Alternatively or additionally, two co-rotating phases may also be interrupted by a contra-rotating phase.

To achieve the most uniform possible baked product, it is especially advantageous if the duration of the different operating phases (contra-rotating phases and co-rotating phases) is always the same. This achieves the result that the specific flow states assigned to the different operating phases are each maintained for an equal length of time.

In addition, the fact that the duration of a baking operation is distributed uniformly among the various operating phases (co-rotating phases and contra-rotating phases) yields the result that the bakery goods are on the whole each exposed for equal lengths of time to the different flow states, which in turn leads to an improvement in the uniformity of the baked product. For example, if four different operating phases are provided, the duration of the corresponding baking operation on the whole can be divided by four or by a multiple of four to determine the length of the individual operating phases.

To achieve the most uniform possible baked product, it is especially advantageous if the fans have essentially a uniform circulation output in terms of absolute value. This may be especially simple to achieve by having the fans all be of the same design and driven at the same rotational speed.

An exemplary embodiment of the invention is illustrated in the drawings as an example and is explained briefly below. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

FIG. 6 is graph showing circumferential velocity of the two fans of the baking oven depicted in FIG. 1, plotted as a function of the duration of a baking operation.

DESCRIPTION OF THE PREFERRED EMBODIMENT

Figure 1:
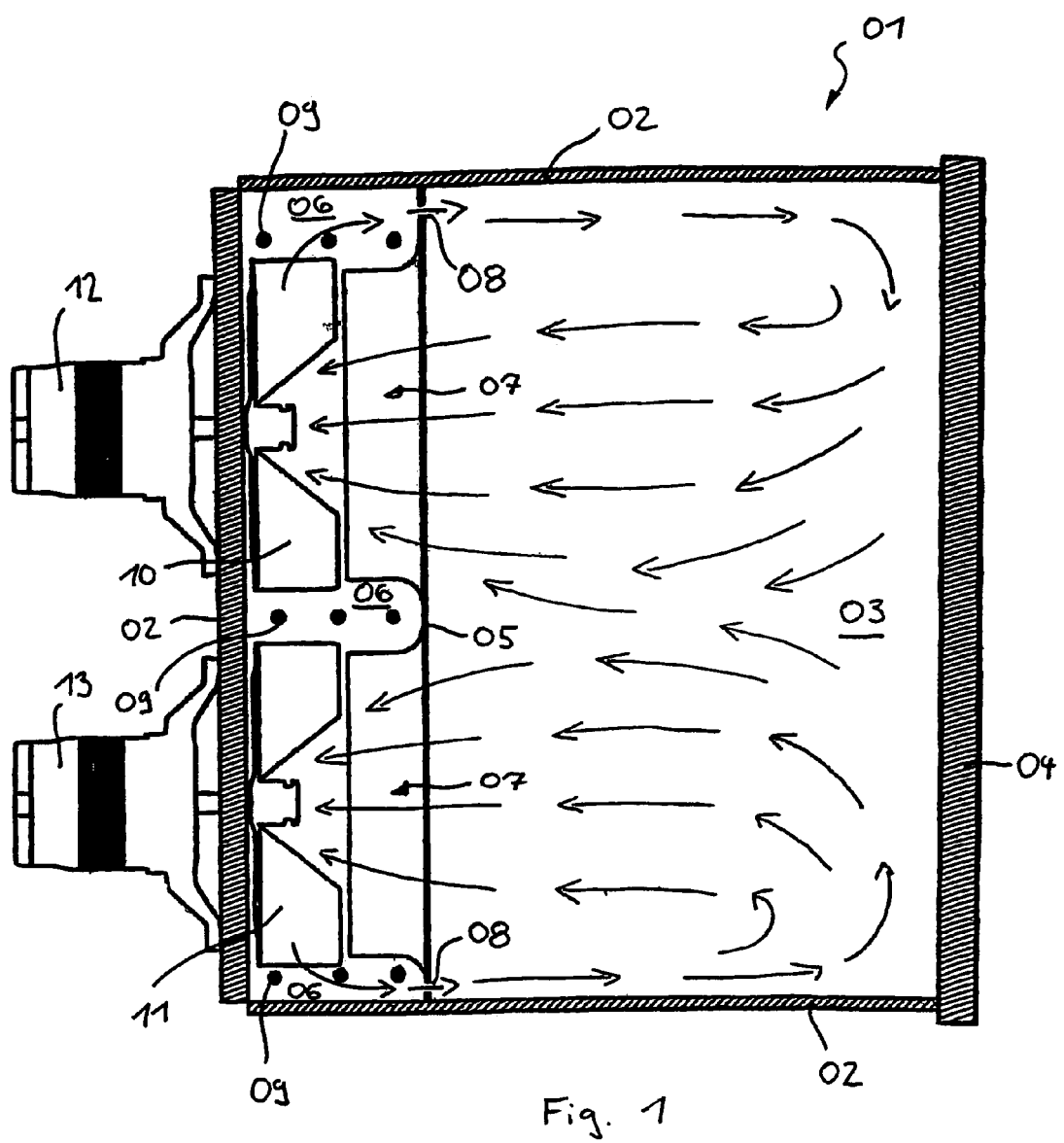
FIG. 1 is a schematic diagram of a baking oven in cross section.

FIG. 1 shows a baking oven 01, which may be used as a shop baking oven, for example, shown here in cross section. To facilitate an understanding, only the parts of the baking oven 01 which are necessary for an understanding of this invention are shown here.

A baking chamber 03 formed by wall elements 02 can be closed by a door 04 on the front side of the baking oven 01. Baking sheets (not shown in FIG. 1) with the bakery goods arranged on them can be placed in the baking chamber 03.

A sheet metal partition 05 mounted in the rear space of the baking chamber 03 separates the baking chamber 03 from a heating chamber 06. The sheet metal partition 05 has two inflow nozzles 07 through which air can flow out of the baking chamber 03 and into the heating chamber 06. In addition, outflow channels 08 are provided in the sheet metal partition 05, arranged on the edges so that air from the heating chamber 06 can flow through them and back into the baking chamber 03.

In order to be able to heat the air in the heating chamber, electrically heatable heating wires 09 are provided, as indicated schematically in FIG. 1. To circulate the air, two fans 10 and 11 are provided; these fans are driven by fan motors 12 and 13. During a baking operation, the fans 10 and 11 are driven to rotate by the fan motors 12 and 13, so that the air, as indicated schematically by flow arrows in FIG. 1, is drawn through the inflow nozzles 07 into the heating chamber 06. The excess pressure thereby created in the heating chamber 06 causes the air to flow over the heating rods 09, which heats it. Then the air flows through the outflow channels 08 in the sheet metal partition 05 back into the baking chamber 03.

A control unit is provided on the baking oven 01 so that the fan motors 12 and 13 can be triggered in accordance with the specifications of an operating program. Depending on the specifications of the control unit, the fan motors 12 and 13 can each be driven independently of one another either clockwise or counterclockwise.

FIGS. 2 through 5 show the fans 10 and 11 and their respective direction of rotation during different operating phases.

Figure 2:
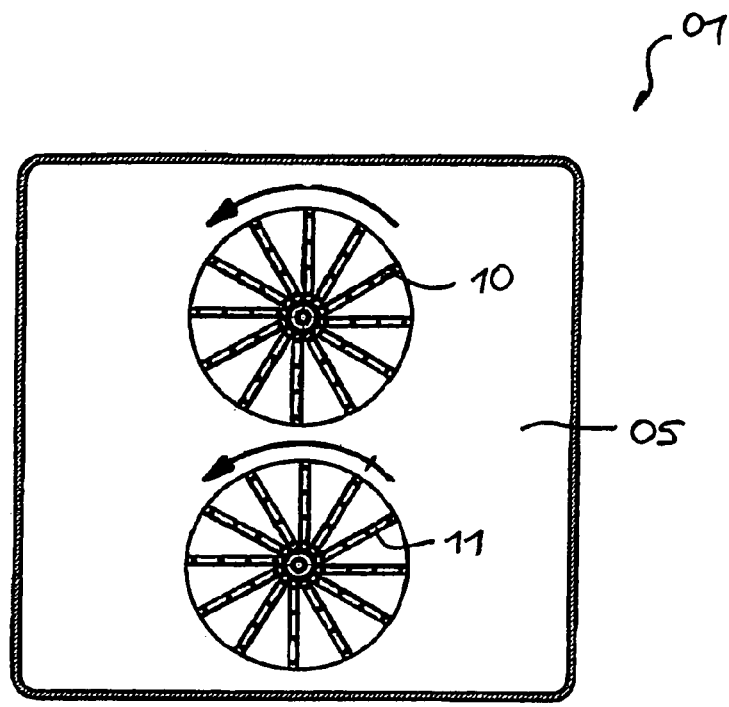
FIG. 2 is a front view showing the fans of the baking oven according to FIG. 1 in a first operating phase.
Figure 3:
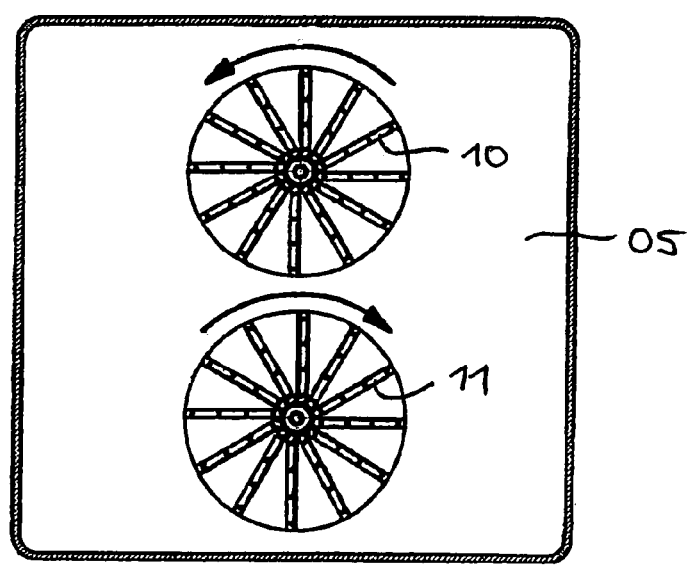
FIG. 3 is a front view showing the fans according to FIG. 2 in a second operating phase.

In the first operating phase P1 shown in FIG. 2, the two fans are driven counterclockwise in co-rotating operation. In a subsequent second operating phase P2 shown in FIG. 3 the two fans 10 and 11 are driven in the opposite direction. The fan 10 then runs counterclockwise, whereas the fan 11 is driven to revolve clockwise.

Figure 4:
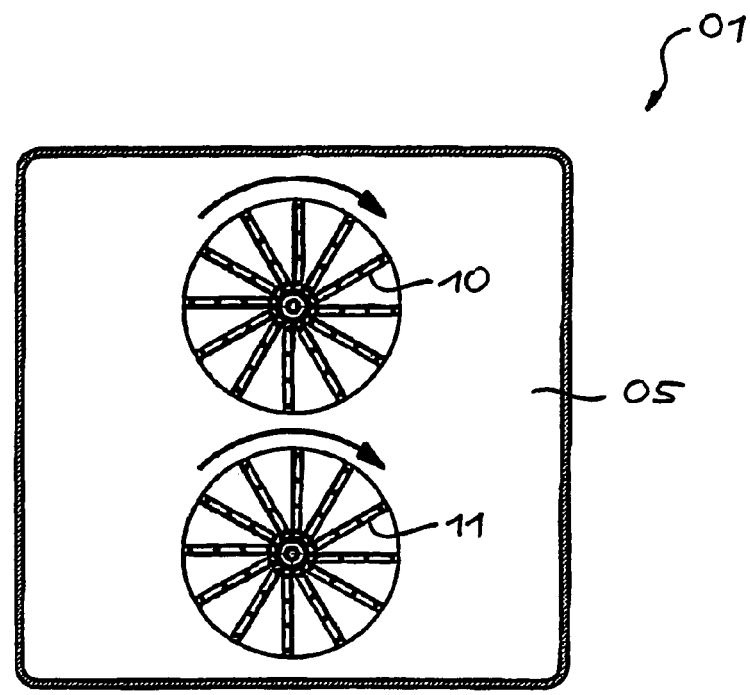
FIG. 4 is a front view showing the fans according to FIG. 2 in the third operating phase.

In the subsequent third operating phase depicted in FIG. 4, the two fans 10 and 11 are again driven to rotate in the same direction, whereby in this co-rotating phase the two fans 10 and 11 revolve clockwise. In this second co-rotating phase P3, the fans 10 and 11 have opposite directions of rotation in comparison with the first co-rotating phase P1 in FIG. 2.

Figure 5:
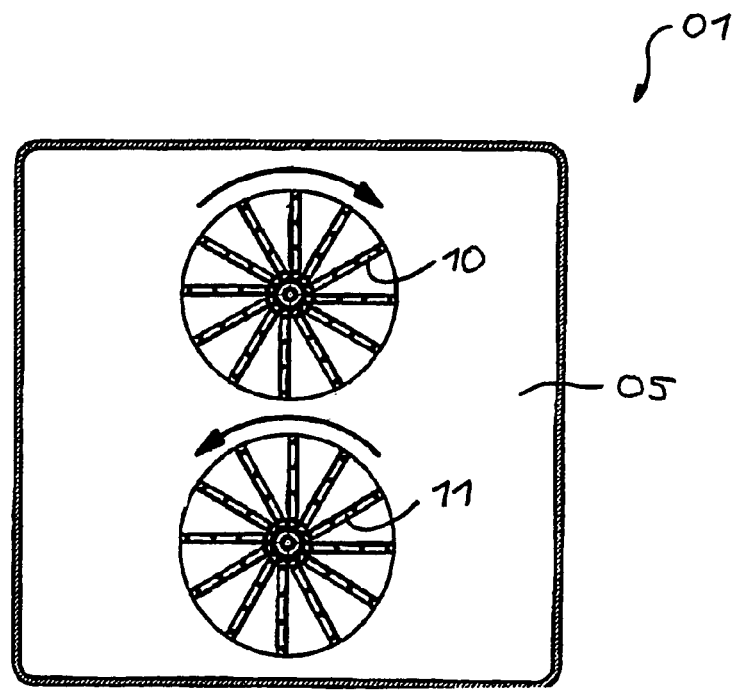
FIG. 5 is a front view showing the fans according to FIG. 2 in a fourth operating phase.

In the next following operating phase, the fourth operating phase P4, as depicted in FIG. 5, the fans 10 and 11 are again driven in opposite directions, but in this second contra-rotating phase P4, the fans 10 and 11 are each driven to rotate in the other direction in comparison with that of the first contra-rotating phase P2.

In FIG. 6, by way of example, the peripheral velocities of the fans 10 and 11 have been plotted over the duration of a baking operation. This diagram is idealized in a rectangular form with regard to the acceleration phases because the changes in the peripheral velocities between individual operating phases of course require a certain period of time. The solid line represents the peripheral velocity of the fan 10. The dotted line however represents the peripheral velocity of the fan 11. At the beginning of the baking operation, the two fans 10 and 11 are accelerated to the same peripheral velocity but in counterclockwise direction. This first co-rotating phase P1 ends at point in time $t_1$ at which the fan motor 13 is reversed so that the fan 11 rotates at the same peripheral speed but in the opposite direction, i.e., clockwise in the contra-rotating phase P2 which then follows.

The first contra-rotating phase P2 ends at point in time $t_2$ at which the fan motor 12 is also reversed so that then in the next phase, the second co-rotating phase P3, the two fans 10 and 11 again rotate jointly in co-rotation but both also rotate clockwise. The second co-rotating phase P3 ends at point in time $t_3$ at which the fan motor 13 is again reversed so that the fan 11 is again rotating in counterclockwise direction and thus begins a second contra-rotating phase P4. The second contra-rotating phase P4 in turn ends at point in time $t_4$ at which the fan motor 12 is again reversed so that the fan 10 also rotates counterclockwise.

The state then achieved corresponds to the initial state at the point in time $t_0$ so that again a co-rotating phase P1' follows the second contra-rotating phase P4. The co-rotating phase P1' is followed by another contra-rotating phase P2', another co-rotating phase P3' and another contra-rotating phase P4'. After the end of the contra-rotating phase P4', the baking operation is concluded and the baked goods can be removed from the baking oven 01.

The sequence of operating phases shown in FIG. 6 is to be understood only as an example. Of course any desired variations of contra-rotating and co-rotating phases are also conceivable. The different operating phases should preferably be of the same length. However operating phases of different lengths are also conceivable. A baking operation may also be concluded before the regular end of an operating phase.

While a specific embodiment of the invention has been shown and described in detail to illustrate the application of the principles of the invention, it will be understood that the invention may be embodied otherwise without departing from such principles.

What is claimed is:

1. A method of operating a shop baking oven having a baking chamber in which the goods to be baked can be accommodated, having at least one heating system for heating air circulating in the baking chamber and having at least two fans for circulating the air in the baking chamber, the method comprising:

driving the fans to rotate in the same direction during a baking operation in at least one co-rotating phase; and driving the fans to rotate in opposite directions during the baking operation in at least one contra-rotating phase, wherein during the baking operation at least two co-rotating phases and/or at least two contra-rotating phases are provided, whereby a contra-rotating phase is provided between two co-rotating phases and/or a co-rotating phase is provided between two contra-rotating phases.

2. The method according to claim 1, wherein during the baking operation at least two different co-rotating phases are provided where the fans are driven to rotate counterclockwise during the one co-rotating phase and whereby the fans are driven to rotate clockwise during the other co-rotating phase.

3. The method according to claim 1, wherein during the baking operation at least two different contra-rotating phases are provided whereby the fans are driven to rotate in the opposite direction of rotation respectively during the different contra-rotating phases.

4. The method according to claim 1, wherein the contra-rotating phase and co-rotating phase each essentially have the same duration.

5. The method according to claim 1, wherein the duration of a baking operation is distributed uniformly among the contra-rotating phase and co-rotating phase.

6. The method according to claim 1, wherein the fans are operated at essentially the same circulation output in terms of absolute value.

* * * * *